United States Patent [19]

Christiansen

[11] 4,040,565
[45] Aug. 9, 1977

[54] CONTROL UNIT FOR THERMAL CONDITIONING SYSTEMS

[76] Inventor: Jorn Uffe Christiansen, Hvidovre Strandvej 48, DK-2650 Hvidovre, Denmark

[21] Appl. No.: 678,497

[22] Filed: Apr. 20, 1976

[30] Foreign Application Priority Data

Apr. 21, 1975 Denmark .......................... 1715/75

[51] Int. Cl.² .................... G05D 23/00; F28D 7/10
[52] U.S. Cl. ............................. 236/91 G; 236/91 R; 236/46 A; 165/157
[58] Field of Search ............. 236/91 G, 91 R, 46 R, 236/46 F, 46 A, 91 D; 165/28; 62/157

[56] References Cited

U.S. PATENT DOCUMENTS

| | | | |
|---|---|---|---|
| 2,570,810 | 10/1951 | Hooghkirk | 236/1 R X |
| 3,059,854 | 10/1962 | Fehlinger | 236/91 R |
| 3,951,337 | 4/1976 | Reiner | 165/28 X |
| 3,979,059 | 9/1976 | Davis et al. | 236/46 R |

FOREIGN PATENT DOCUMENTS 1,391,339   1975   United Kingdom ............ 236/91 R

*Primary Examiner*—William E. Wayner
*Assistant Examiner*—Larry Jones
*Attorney, Agent, or Firm*—Hill, Gross, Simpson, Van Santen, Steadman, Chiara & Simpson

[57] ABSTRACT

A control unit for a temperature regulating system for heating or cooling a space includes an analog network, responsive to various variable environmental factors and simulating various fixed environment or building factors, is connected to a condenser to charge it. A predetermined voltage represents the desired temperature and is measured by a voltage sensor which is connected with circuitry for calculating rapidly the time needed for the system to be "on", whereby, for example, needed heating time is determined in a fraction of the actual time.

5 Claims, 4 Drawing Figures

CONTROL UNIT FOR THERMAL CONDITIONING SYSTEMS

BACKGROUND OF THE INVENTION a. Field of the Invention

This invention relates to a control unit for thermal conditioning systems required to cool or heat one or more building spaces, and is of the type used where an air-conditioning plant or heat-emitting system has been off for a period and has to start again in time for the space to attain a desired temperature by a predetermined time, said control unit being started by a control clock.

b. Prior Art

In buildings not in heated use 24 hours or all days of the week it is possible to save energy by lowering the temperature during the time intervals when the buildings are unoccupied.

Savings may be achieved by partly turning off the heating, ventilation and pumping plant.

After such a reduced operation of a thermal conditioning system, stepped-up operation of the thermal conditioning system will be required some time before the building is to be occupied.

Time intervals, i.e. the time from the start of the system until the desired temperature is attained in the building, vary greatly in accordance with the circumstances, such as the outside temperature, wind-velocity, sunlight, inside temperature, humidity of the air and the constants of the building, such as insulation, specific heat, external and internal heat-conductors, air change, the temperature of the walls, the capacity of the thermal conditioning system etc.

For starting the thermal conditioning system, various control units have been suggested that take at least some of these parameters into consideration, so that start of the system takes place as late as possible, thereby saving as much energy as possible and still securing a satisfactory climatic condition of the building at a predetermined time, for instance at the beginning of working hours.

Most of the units of this type operate according to linear principles or graphic programming and a voltage is built up according to predetermined temperatures and compared with electronically or mechanically predicted values obtained over a time interval corresponding to the earliest possible time of starting, for instance 4 to 8 hours before the building has to reach the required comfortable climatic condition.

In British Pat. No. 1,193,711 such a control unit for thermal conditioning systems is described. In this unit, the time of starting is determined on the basis of the inside temperature and the outside temperature, while the above-mentioned conditions and the constants of the building, the building rooms or spaces as well as the temperature of the building elements are not taken into account.

Due to the above-mentioned conditions, such a control unit will make miscalculations when there are major fluctuations of temperature, especially in buildings where the building elements have several thermal time constants of importance.

The operation of such a unit may to some extent be satisfactory, provided the intervals of non-operation are of equal duration, and sufficiently short so that the building does not cool down to the low maintenance temperature. If there are longer intervals of non-operation, for instance during a weekend, the walls of the building and the existing equipment will be cooled still more, and therefore it will take longer to heat up the building to the desired temperature. Because of this fact, the prior unit cannot calculate the correct time for starting the thermal conditioning system on the basis of the inside and outside temperature alone. This fact is so widespread a phenomenon of the hitherto known control units that within this field this condition is in everyday speech called the -37 monday phenomenon". If the control unit is adjusted to fit certain conditions, the system will not work under other conditions, as it makes miscalculations when the wall and other heat-consuming parts cool even more during weekends, holidays and the like.

SUMMARY OF THE INVENTION

The purpose of the present invention is to provide a control unit which eliminates the mentioned drawbacks, as not only the outside temperature and the inside temperature are taken into account when calculating the starting time, but also the constants of the building and the spaces and the temperature of the building elements, as an electrical network is used to represent these factors when determining the starting time. The principle is that electronic components like in an analog calculating machine are placed in the control unit, and that the values of the components correspond to the constants of the building, for instance condensers correspond to heat capacity, electric resistors correspond to thermal resistors, current to power and voltage to temperature.

The electronic components and with them the voltages and currents are adjusted such that the changes in the electronic circuits corresponding to the parameters of the building will take place at a rate which is substantially higher than the corresponding changes of temperature in the building.

The initial condition for the network is established in the control unit via the sensors for the inside temperature, the wall temperature, inside humidity and outside temperature, and possibly wind velocity and sunlight.

The time at which the control unit starts functioning is determined by means of an adjustable clock, for instance six hours before the required time when the building has to have the desired climatic condition.

At this stage, the position of one or more electronic or mechanical units is changed, so that a voltage or source of current will be established corresponding to a start of the heating system of the building.

In the electronic circuit, the voltage (or current) will then increase, corresponding to the increasing inside temperature of the building, such, however, that the increase of the current in the electronic circuit will take place considerably faster than the actual inside change of temperature would have occurred in the building during corresponding conditions.

In this way, the electronic network in the control unit will in a short time carry out the predictive calculations for the heating of the building, which determine the increase of the inside temperature of the building.

From the moment of the increase of the current in the electronic network to the moment when a current or voltage passes a threshold corresponding to the desired temperature in the building (for instance 20° C of the air or 18° C at a wall) a circuit in the control unit will measure this short interval.

Thereafter, this simulated time interval will be transformed into actual time for the conditioning system, and the control unit will start the system at this time interval, for instance, the beginning of working hours.

The mentioned transformation of time may occur by letting a counter with an oscillator having a high frequency measure the first time interval. When the voltage or current corresponding to the inside temperature attains the desired value, corresponding to an inside temperature of for instance 20° C, the oscillator will after a slight time delay (which may be used as time offset) via a control circuit change to a lower frequency and count further until the counter produces a certain signal, upon which the thermal conditioning system starts.

Figure 4:
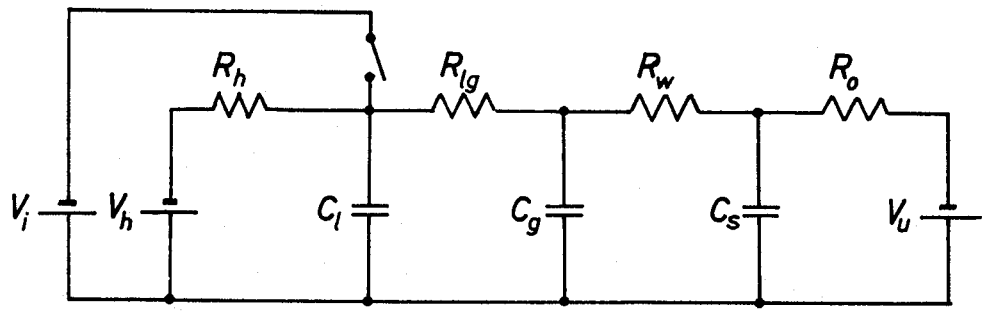
Figure 2:
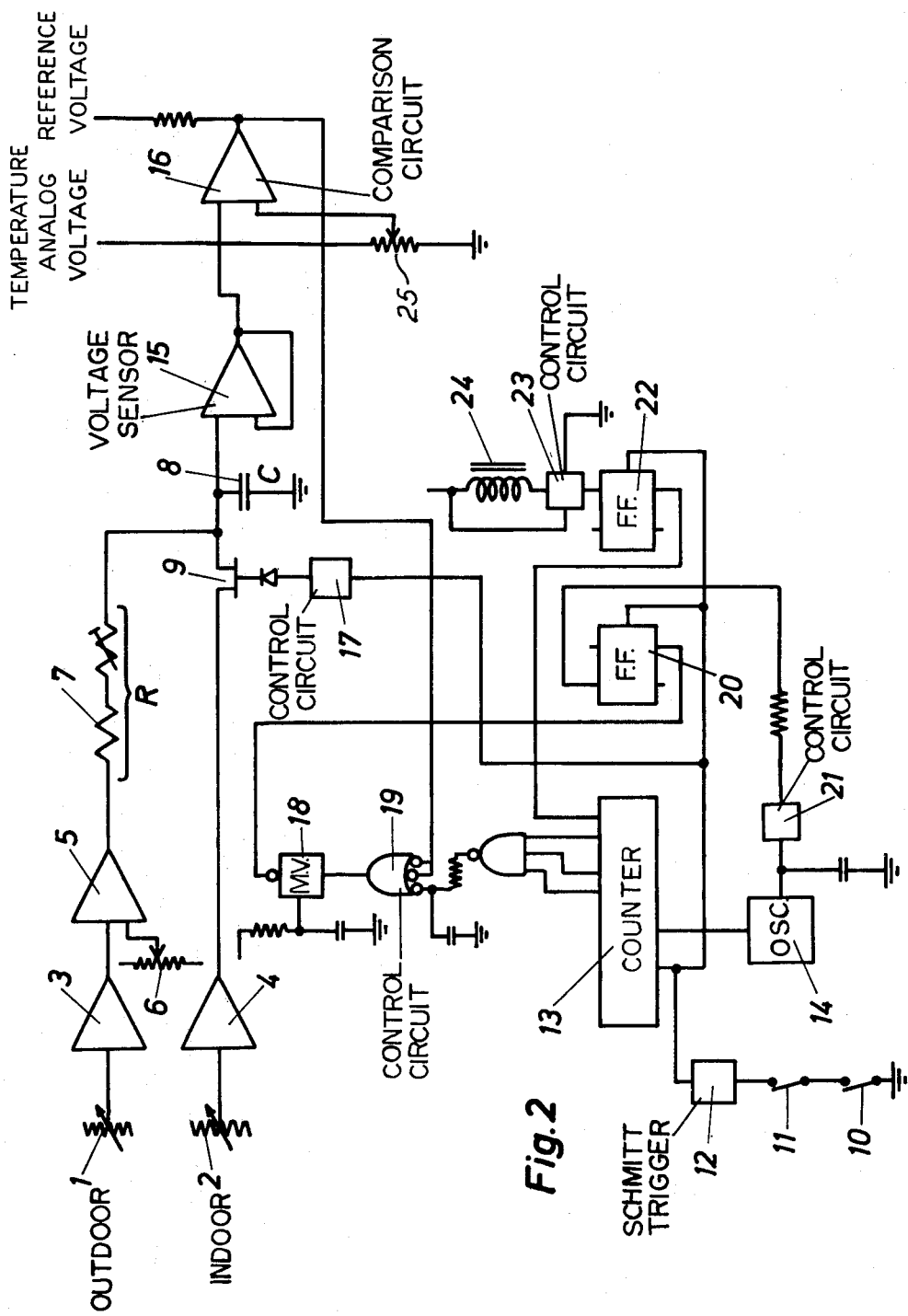
FIG. 2 is a diagram of a control unit according to the invention.
Figure 3:
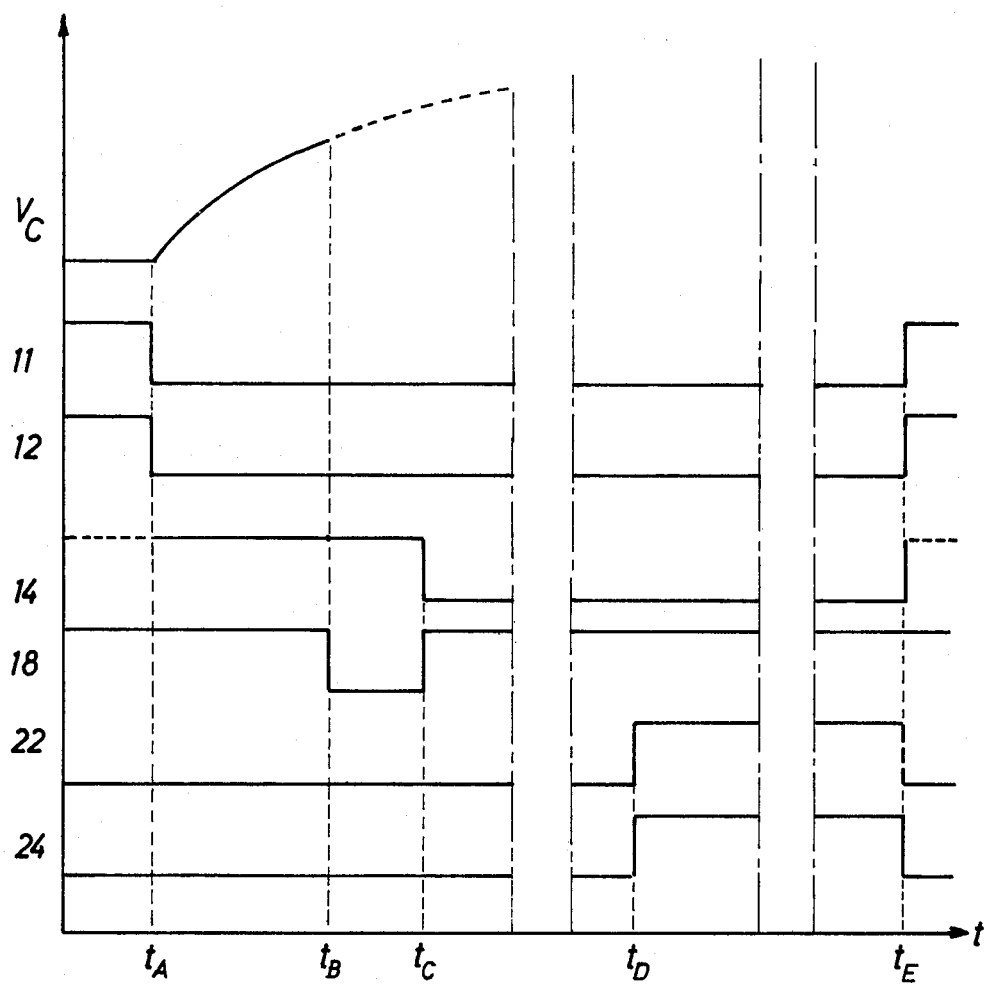

FIG. 3 a diagram showing the principle of operation of the control unit in FIG. 2, and FIG. 4 a diagram of a circuit corresponding in greater degree to actual conditions.

As Shown On The Drawings:

The energy supplied to a building during heating can be divided into the part retained by the building and its contents, and the part disappearing as loss, for instance through the walls of the building.

As a simplified description this relationship can be expressed by the equation:

$$P \cdot dt = Q d\theta_i + (\theta_i - \theta_u)k \cdot dt \qquad (1)$$

where P is the supplied power, Q the heat capacity of the building, $\theta_u$ the outside temperature and $\theta_i$ the inside temperature. The part of the equation before the equal sign refers to heat consuming for storage while the part after the equal sign refers to heat loss.

Figure 1:
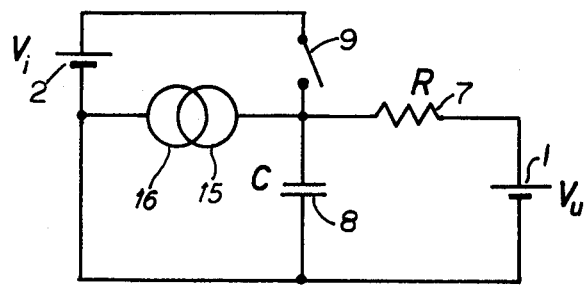
FIG. 1 is a diagram for explaining the electric analogs.

In FIG. 1, the current I, upon opening the switch, can be expressed by:

$$I = C(dv/dt) + (V_i - V_u) \cdot 1/R$$

which can be rewritten as follows:

$$I dt = CdV + (V_i - V_u)(1/R) dt \qquad (2)$$

As it appears from (1) and (2) these expressions are uniform, and it can be said that

*I* is the analog of *P*
*C* is the analog of *Q*
$V_u$ is the analog of $\theta_u$
$V_i$ is the analog of $\theta_i$
$1/R$ is the analog of $k$ Thus, it is possible to simulate the heating process of a building by means of electric circuits, and as these can work very fast, the heating process can be electrically calculated in a short time, and this time can then be transformed into actual control time so that the starting time for the heating or conditioning system can be determined.

In FIG. 2 is a diagram of a control unit according to the invention. This unit comprises a sensor 1 for the outside temperature and a sensor 2 for the inside temperature, as well as their amplifiers 3 and 4. The signal representing the outside temperature is added in a third amplifier 5 to a voltage from a potentiometer 6. A series connection 7 of two resistors, of which the one is adjustable, is connected to the amplifier 5 and to a condenser 8, which is grounded. Between the amplifier 4 for the inside temperature signal and the condenser 8, an electronic switch 9 is connected. The network hitherto described corresponds to elements in the circuit in FIG. 1.

The control unit further comprises a main switch 10, a clock switch 11, a Schmitt trigger 12, a counter 13 and an oscillator 14, and also a voltage sensor 15 and a comparison circuit 16 as well as various control circuits which are explained below.

The operation of the control unit will be explained in the following with reference to the operation chart in FIG. 3.

At the time $t_A$ the clock switch 11 closes, , for instance six hours before the beginning of working hours, and the Schmitt trigger 12 causes the electronic switch 9 to switch off via a control circuit 17.

Solving the differential equations (1) and (2) with regard to $\theta_i$ and $V_i$ respectfully results in the following:

$$\theta_i = \left(\frac{P}{K} + \theta_u\right)\left(1 - e^{-\frac{t}{\tau}}\right) + \theta_s \cdot e^{-\frac{t}{\tau}} \qquad (3)$$

and $$V_i = (I \cdot R + V_u)\left(1 - e^{-\frac{t}{\tau}}\right) + V_s \cdot e^{-\frac{t}{\tau}} \qquad (4)$$

where $I \cdot R$ in the latter expression can be replaced by the voltage from the voltage divider 6 in the network in FIG. 2:

$$V_i = (V_p + V_u)\left(1 - e^{-\frac{t}{\tau}}\right) + V_s \cdot e^{-\frac{t}{\tau}} \qquad (5)$$

in which $\tau$ is $Q/k$ respectively $R \cdot C$, while $\theta_s$ and $V_s$ are respectively the temperature and the voltage for the time $t_A$ of $\theta_i$ and $V_i$.

The potential on the condenser 8 which at the time $t_A$ is $V_s \sim \theta_s$ will change according to the formula (5), as the potentiometer 6 represents the value of P/k. By means of the sensor 15 this potential is compared with a preadjusted temperature analog voltage in the comparison circuit 16, for instance corresponding to an inside temperature of 20°C and obtained from a potentiometer 25. When this threshold is passed, a monostable multivibrator 18 will be started by a control circuit 19 at the time $t_B$ in FIG. 3. After the multivibrator 18 changes at the time $t_c$, a flip-flop circuit 20 will change.

At the same time as the electronic switch 9 opens, the Schmitt trigger connects the counter 13 supplied with signals from the oscillator 14 at a relatively high frequency, for instance 13 Kc/s. When the flip-flop circuit twenty changes at the time $t_c$, the oscillator 14 will continue to oscillate, but by means of a control circuit 21 at a substantially lower frequency, for instance 1.3 c/s. The value that the counter 13 has at the time $t_B$ is thus an expression for the time required to heat the building to the desired temperature, for instance 20° C. The monostable multivibrator 18 may be used as time offset so that the counter continues an interval of time.

The counter 13 continues at the lower frequency until at the time $t_D$, which is the predicted time before the beginning of the working hours corresponding to the counter's value at the time $t_C$, it produces a signal, after which another flip-flop circuit 22 changes and by a control circuit 23 energizes a relay 24 which connects the conditioning system.

It is possible, for instance, with the frequencies given as examples to transform a 6-hour heating time corresponding to 21600 sec. to a measured period of only 2.16 sec.

At the time $t_E$, for instance at the end of working hours, the clock again switches off its contact 11, whereby the flip-flop circuits 20 and 22 are reset, the relay 24 is disconnected and the condenser will after a while again attain the potential corresponding to the inside temperature of the building.

The resistance 7 (R) and the condenser 8 (C) and the adjustment of the potentiometer 6 are selected to correspond to the constants of a particular building. These components illustrate a simplified circuit, thereby making the explanation and understanding of the control unit easier. FIG. 4 shows how the analog circuit may be constructed in order better to correspond to the actual conditions.

By means of a switch, the circuit in FIG. 4 can be further improved by attaching a sensor amplifier to the condenser $C_g$, the output voltages of the amplifier corresponding to the inside wall temperature (see sensor amplifier 15 and condenser 8 in FIG. 2.).

The control unit according to the invention can also be modified so that the simulated time is repeated after the first measuring, if there is a considerable time period between the start of the unit and the start time of the conditioning system when the variable parameters, i.e. the temperature, may have changed considerably.

The advantages of the control unit according to the invention are the following:

a. The voltages and currents increase in accordance with the actual conditions, but are transformed in time; this means that the control unit need not contain non-linear components, even if increase in temperature as a function of time is non-linear.

b. The electronic components are equivalent to the thermal elements. This means that adjustment of a part of the system need not influence another part of the system.

c. The two above-mentioned conditions result in a simplified adjustment of the control unit according to the parameters of the building, just as the control unit can better be adapted to the various types of the buildings and climatic conditions.

d. The transformation of time means that the calculation can be made in a small time interval and that the electronic components can be provided at low cost and have small physical dimensions, just as the temperature drift in amplifiers and the like is reduced considerably.

e. Voltages can be measured at various places in the electronic network, and a value corresponding to a temperature of the air, on or inside a building element, is thus obtained. Thus the unit can consider climatic comfort conditions (that the walls are not to be cold, as this may result in a downdraft of cold air, draft etc.)

f. Voltages from the temperature sensors in building elements or contents be introduced in the circuit so that the temperatures of the building elements can be considered.

What I claim is:

1. A central unit for shutting down and restarting a thermal conditioning system, such as for at least one building space, comprising:
    a. a first voltage source responsive to outdoor temperature;
    b. a second voltage source responsive to the temperature of at least one building element;
    c. a resistor sized to be the analog of the thermal constants affecting said space;
    d. a third voltage source responsive to indoor temperature in the space;
    e. a condenser sized to be the analog of the capacity of the thermal conditioning system;
    f. said first, second and third voltage sources and said resistor being connected together to form a charging network connected to said condenser;
    g. a voltage sensor connected to said condenser;
    h. a comparison circuit connected to said voltage sensor and to a preadjusted fourth voltage source representing the desired temperature;
    i. a time clock switch; and
    j. a time-determining network under the control of said time clock switch and said comparison circuit for energizing the system when needed in order for the building space to reach the desired temperature at a predetermined time.

2. A control unit according to claim 1 which includes at least one RC-coupling connecting said third voltage source to said condenser, each said coupling being sized to be the analog of a factor affecting the temperature of the building space.

3. A control unit according to claim 1 which includes an amplifier connected in series with at least one of said first, second, and third voltage sources.

4. A control unit according to claim 1 in which said time-determining network comprises:
    a. a counter under the control of said time clock and connected for energizing the system when a certain count is reached; and
    b. an oscillator connected to supply a high frequency signal to said counter, said comparison circuit being connected to said oscillator to change its signal to a low frequency signal.

5. A control unit according to claim 1 in which said time-determining network comprises:
    a counter under the control of said time clock and connected for energizing the system when a certain count is reached;
    b. an oscillator connected to supply a high frequency signal to said counter;
    c. a monostable multivibrator connected to be operated by said comparison circuit; and
    d. a flip-flop circuit driven by said multivibrator when it changes back to its stable condition, said flip-flop circuit being connected to said oscillator to cause it to oscillate at a considerably lower frequency.

* * * * *